Patented June 16, 1931

1,810,008

UNITED STATES PATENT OFFICE

IVAN GUBELMANN, HENRY J. WEILAND, AND OTTO STALLMANN, OF SOUTH MILWAUKEE, WISCONSIN, ASSIGNORS, BY MESNE ASSIGNMENTS, TO NEWPORT CHEMICAL CORPORATION, A CORPORATION OF DELAWARE

4'-SULPHO-2-BENZOYL-5-NITRO-BENZOIC ACID AND PROCESS FOR MAKING SAME

No Drawing.  Application filed July 2, 1927.  Serial No. 203,259.

This invention relates to 4'-sulpho-2-benzoyl-5-nitro-benzoic acid and to a process for making the same.

It is an object of this invention to provide a simple and economical process for preparing 4'-sulpho-2-benzoyl-5-nitro-benzoic acid, which is an intermediate from which valuable dyestuffs may be prepared.

Other and further important objects of this invention will become apparent from the disclosures in the following description and appended claims.

We have now discovered that 4'-sulpho-o-benzoyl-benzoic acid, which has been described in our co-pending application Serial No. 203,265, filed July 2, 1927, can be nitrated under certain conditions to 4'-sulpho-2-benzoyl-5-nitro-benzoic acid. We have proved that the $NO_2$ group enters in meta position to the carboxyl group and in para position to the ketone group. It was quite unexpected that the $NO_2$ group would enter the benzoic acid complex, since in the case of the nitration of 4'-methyl-benzoyl-o benzoic acid and 4'-chloro-o-benzoyl benzoic acid, the $NO_2$ group enters the benzoyl complex.

The reaction illustrating this invention is most probably best expressed by the following chemical equation:

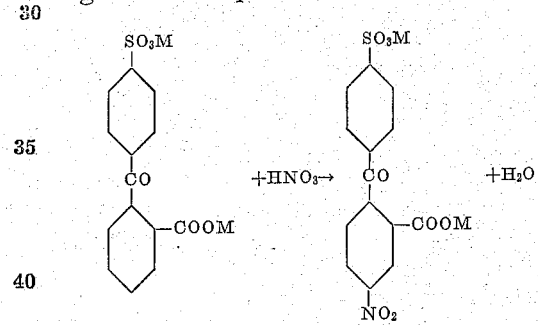

in which M represents hydrogen or a metallic radical such as for example sodium.

4'sulpho-2-benzoyl-5-nitro-benzoic acid (mono sodium salt) is a white crystalline powder, easily soluble in water, imparting to it a light yellow color. It is likewise easily soluble in dilute caustic soda, sodium carbonate and ammonia solutions. It is, however, sparingly soluble in cold alcohol. It can be recrystallized from hot water containing a small amount of sulphuric acid in the form of small white needles.

Without limiting our invention to any particular procedure, the following example, in which parts by weight are given, illustrates the application of our invention in the preferred form:

328 parts of 4'-sulpho-o-benzoyl-benzoic acid (mono sodium salt) are dissolved in 650 parts of sulphuric acid monohydrate at 15 to 20° C. To this solution is added over a period of 6 to 8 hours a mixture consisting of 100 parts of mixed acid analyzing 70% $HNO_3$, 22% $H_2SO_4$, 8% $H_2O$, and 480 parts of 25% oleum, keeping the temperature at 15 to 20° C. The temperature is then raised to 35 to 38° C. and held at this temperature for about 3 hours. The nitration mass is then slowly run into a mixture of 2500 parts of ice and 1500 parts of water, and the nitrated product salted out with about 1000 parts of common salt. The product, 4'-sulpho-2-benzoyl-5-nitro-benzoic acid (mono sodium salt), precipitates and is filtered off, washed with cold water and dried.

Instead of starting with the mono-sodium salt, as in the above example, either the free acid or the di-sodium salt may be employed. Similarly, the composition of the nitrating mixed acid may be varied within reasonable limits.

We are aware that numerous details of the process may be varied through a wide range without departing from the principles of this invention, and we therefore do not purpose limiting the patent granted hereon, otherwise than necessitated by the prior art.

We claim as our invention:

1. The process for preparing 4'-sulpho-2-benzoyl-5-nitro-benzoic acid, which comprises reacting a solution of 4'-sulpho-o-benzoyl-benzoic acid in concentrated sulphuric acid with a nitrating agent.

2. The process for preparing 4'-sulpho-2-benzoyl-5-nitro-benzoic acid, which comprises reacting a solution of the mono sodium salt of 4'-sulpho-o-benzoyl-benzoic acid in sulphuric acid monohydrate with a nitrating mixed acid, diluting up the nitration mass with water, salting out and filtering off the product.

3. As a new article of manufacture, 4'-sulpho-2-benzoyl-5-nitro-benzoic acid, having in the form of the free acid most probably the following chemical constitution,

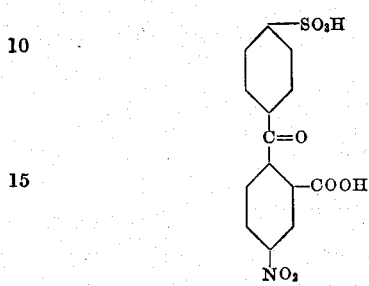

4. The process of producing a nitro-4'-sulpho-ortho-benzoyl-benzoic acid in which the nitro group is in the benzoic acid nucleus, which comprises subjecting 4'-sulpho-ortho-benzoyl-benzoic acid to direct nitration.

5. A process for preparing 4' sulpho-2-benzoyl-5-nitro-benzoic acid, which comprises reacting 4' sulpho-o-benzoyl-benzoic acid dissolved in concentrated sulfuric acid with a nitrating agent at a temperature ranging from 15° to 38° C.

6. As a new article of manufacture, a 4' sulpho-2-benzoyl-5-nitro-benzoic acid compound, having most probably the following chemical constitution in which M is an alkali metal

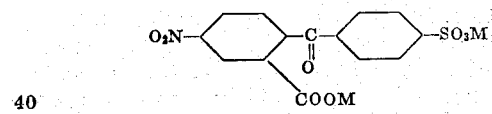

which compound may be prepared by treating a sulfuric acid solution of 4' sulpho-o-benzoyl-benzoic acid with a nitrating agent.

7. As a new article of manufacture, a 4'-sulpho-2-benzoyl-5-nitro-benzoic acid compound having, in the form of the free acid, the following formula:

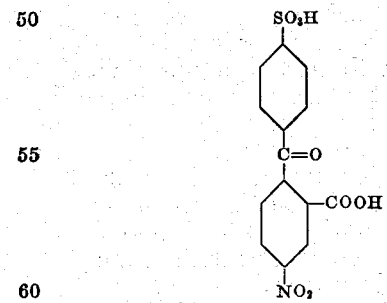

which may be prepared by treating a solution of 4'-sulpho-o-benzoyl-benzoic acid in sulfuric acid monohydrate with a nitrating acid consisting of a mixture of 70% nitric acid, 22% sulphuric acid and 8% water, together with a quantity of 25% oleum, at a temperature ranging between 15° and 38° C.

In testimony whereof we have hereunto subscribed our names.

IVAN GUBELMANN.
HENRY J. WEILAND.
OTTO STALLMANN.